(12) United States Patent
Brenner et al.

(10) Patent No.: US 9,140,532 B2
(45) Date of Patent: Sep. 22, 2015

(54) MEASURING HEAD FOR A COORDINATE MEASURING MACHINE FOR DETERMINING SPATIAL COORDINATES ON A MEASUREMENT OBJECT

(71) Applicant: Carl Zeiss Industrielle Messtechnik GmbH, Oberkochen (DE)

(72) Inventors: Kurt Brenner, Satteldorf (DE); Walter Jenisch, Heidenheim (DE); Tobias Woletz, Essingen (DE); Dieter Kaufmann, Heidenheim (DE)

(73) Assignee: CARL ZEISS INDUSTRIELLE MESSTECHNIK GMBH, Oberkochen (DE)

( * ) Notice: Subject to any disclaimer, the term of this patent is extended or adjusted under 35 U.S.C. 154(b) by 162 days.

(21) Appl. No.: 14/067,130

(22) Filed: Oct. 30, 2013

(65) Prior Publication Data

US 2014/0053423 A1    Feb. 27, 2014

(30) Foreign Application Priority Data

May 2, 2011    (DE) .......................... 10 2011 100 467

(51) Int. Cl.
  *G01B 5/00*    (2006.01)
  *G01B 5/008*   (2006.01)
  *G01B 5/012*   (2006.01)

(52) U.S. Cl.
  CPC ................ *G01B 5/008* (2013.01); *G01B 5/012* (2013.01)

(58) Field of Classification Search
  CPC ........ G01B 5/008; G01B 5/012; G01B 5/001; G01B 5/016; G01B 5/0004; G01B 5/004; G01B 5/0002; G01B 5/20; G01B 5/205

USPC ............ 33/503, 556, 557, 558, 559, 560, 561
  See application file for complete search history.

(56) References Cited

U.S. PATENT DOCUMENTS

| 5,028,901 A | 7/1991 | Enderle et al. |
| 2004/0155543 A1* | 8/2004 | Christoph ....................... 310/90 |

(Continued)

FOREIGN PATENT DOCUMENTS

| DE | 39 22 296 A1 | 1/1991 |
| DE | 101 14 126 A1 | 10/2001 |

(Continued)

OTHER PUBLICATIONS

International Search Report for PCT Appl'n No. PCT/EP2012/057349; mailing date of May 29, 2012; 2 pp.

(Continued)

*Primary Examiner* — Yaritza Guadalupe-McCall
(74) *Attorney, Agent, or Firm* — Harness, Dickey & Pierce, P.L.C.

(57) ABSTRACT

A measuring head for a coordinate measuring machine for determining spatial coordinates on a measurement object has a coupling part for detachably receiving a measurement tool. The coupling part has a number of first bearing elements, a magnet and a retaining pin. The measurement tool has a disk with a number of second bearing elements, an anchoring plate and at least one adjustable locking element. The magnet is configured to attract the anchoring plate so as to bring the first and second bearing elements into engagement with one another. The first and second bearing elements, in the engaged state, define a defined position of the measurement tool on the coupling part. The at least one locking element secures the measurement tool to the retaining pin. The anchoring plate is detachably secured to the disk and the at least one locking element retains the anchoring plate on the retaining pin.

18 Claims, 7 Drawing Sheets

(56) References Cited

U.S. PATENT DOCUMENTS

| | | | |
|---|---|---|---|
| 2005/0256672 A1* | 11/2005 | McMurtry et al. | 702/150 |
| 2007/0006473 A1* | 1/2007 | Schopf et al. | 33/558 |
| 2008/0134486 A1 | 6/2008 | Enderle et al. | |
| 2012/0079731 A1 | 4/2012 | Ruck | |
| 2013/0055832 A1 | 3/2013 | Brenner et al. | |
| 2014/0236520 A1* | 8/2014 | Engel et al. | 702/95 |

FOREIGN PATENT DOCUMENTS

| | | |
|---|---|---|
| DE | 10 2005 043 454 A1 | 3/2006 |
| DE | 10 2009 008 722 A1 | 8/2010 |
| DE | 10 2010 018 493 A1 | 10/2011 |
| DE | 10 2010 020 654 A1 | 11/2011 |
| EP | 1 643 208 A2 | 4/2006 |

OTHER PUBLICATIONS

The International Bureau of WIPO; English language translation of International Preliminary Report on Patentability (Chapter 1); issued by WIPO Nov. 5, 2013; 9 pp.

Plasticell Vertriebs GmbH; BAL SEAL Federn für Schnappverschlüsse, zum Zentrieren und zum Dämpfen von Vibrationen; Apr. 2011; 2 pages.

* cited by examiner

MEASURING HEAD FOR A COORDINATE MEASURING MACHINE FOR DETERMINING SPATIAL COORDINATES ON A MEASUREMENT OBJECT

CROSSREFERENCES TO RELATED APPLICATIONS

This application is a continuation of international patent application PCT/EP2012/057349 filed on Apr. 23, 2012 designating the U.S., which international patent application has been published in German language and claims priority from German patent application DE 10 2011 100 467.3 filed on May 2, 2011. The entire contents of these priority applications are incorporated herein by reference.

BACKGROUND OF THE INVENTION

The present invention relates to a measuring head for a coordinate measuring machine and to a measurement tool for such a measuring head.

Coordinate measuring machines are typically used for determining geometric dimensions or even the physical shape of workpieces. A coordinate measuring machine typically has a measuring head, which can be moved relative to the workpiece (called measurement object further down below). Depending on the position of the measuring head relative to the workpiece, spatial coordinates can be determined that represent the position of selected measurement points on the workpiece within a defined measurement volume. If an appropriate plurality of spatial coordinates are determined for a plurality of measurement points, the geometric dimensions and the shape of the measurement object can be determined on the basis of said spatial coordinates.

In many cases, the measuring head has a probe tool with which the selected measurement points are touched. Accordingly, such measuring heads are often referred to as touch probe heads. The corresponding probe tool typically has one or more styli having a tip which serves for probing the selected measurement points. However, there are also measuring heads for coordinate measurement machines which operate without contact, such as with lasers and/or cameras. The present invention is particularly suitable for tactile measurement tools (touch probe tools), but can also be used in non-contact measuring heads and corresponding measurement tools. For the sake of simplicity, however, reference is made to the preferred use, i.e. to a touch probe head having a touch probe tool, in the following.

In order to reach all measurement points in complex workpieces, it is often desirable for the probe stylus to be held in different orientations relative to the probe head. It is also often desirable to attach probe tools having different styli or stylus combinations to the probe head so as to allow all desired measurement points to be reached in an efficient manner.

DE 101 14 126 A1 discloses a probe head having an interchangeable probe tool. The probe tool has a stylus which is angled in the shape of an L and can be secured to the probe head in several rotation angle positions. A rotary disk of the probe tool is arranged above a kinematic three-point bearing at a defined rotation angle position on the probe head. In order to change the rotation angle position, the rotary disk is moved out of the three-point bearing using a pneumatically actuated slider and subsequently rotated on the slider via a rotary drive arranged in the probe head. Subsequently, the rotary disk is moved back into the defined three-point bearing. The rotation angle position of the rotary disk and of the stylus arranged thereon is determined using a sensor, which at the same time also provides signals for the rotary drive.

DE 10 2009 008 722 A1 describes a probe head for a coordinate measurement machine, in which the probe tool can be rotated using measurement force generators and what is referred to as roll projection. Measurement force generators in so-called active probe heads usually serve to apply a defined measurement force during the probing of a measurement point. They are present as a matter of principle in active probe heads and according to DE 10 2009 008 722 A1 are also used for rotating the probe tool.

In the probe head of DE 10 2009 008 722 A1, the rotary disk of the probe tool is held by a retaining pin, via which the rotary disk can be disengaged from its kinematic mount for the rotational movement. According to a specific exemplary embodiment, the retaining pin can be of a two-part design, such that the front free end of the retaining pin, on which the rotary disk is secured, can detach itself from the shaft of the retaining pin if the probe tool impacts too severely with the measurement object or with another obstacle. The separable implementation of the retaining pin thus allows collision protection, preventing at least major damage to the measuring head, measurement tool and/or obstacle.

The same type of collision protection is also described in DE 10 2005 043 454 B3, although for a probe head having a rigid (not rotatable) probe tool.

It has been found that the separable implementation of the retaining pin is unfavorable if the retaining pin also serves for rotating the probe tool and therefore has to absorb torques during the rotation. In this case, the retaining pin must ensure a reliable and stable connection not only with respect to the axial loads but also with respect to loads in the radial direction. At the same time, the free end of the retaining pin, on which the probe tool is secured, must be able to be released easily in the event of a collision. A suitable two-part or multipart realization of the retaining pin is complicated and expensive, especially if the probe head additionally needs to be lightweight and compact.

SUMMARY OF THE INVENTION

Against this background, it is an object of the present invention to provide a measuring head having an alternative collision protection. Preferably, the collision protection should be suitable for a measuring head having a rotatable measurement tool, such as a measurement tool that is rotatable by the method described in DE 10 2009 008 722 A1.

According to a first aspect of the invention, there is provided a measuring head comprising a coupling part for receiving a measurement tool, and comprising a measurement tool detachably coupled to the coupling part, wherein the coupling part has a number of first bearing elements, a magnet and a retaining pin, and wherein the measurement tool has a disk with a number of second bearing elements, an anchoring plate and at least one adjustable locking element, wherein the magnet is configured to attract the anchoring plate so as to bring the first and second bearing elements into engagement with one another, wherein the first and second bearing elements, in the engaged state, define a defined position of the measurement tool on the coupling part, wherein the at least one locking element secures the measurement tool to the retaining pin, wherein the anchoring plate is detachably secured to the disk and wherein the at least one locking element retains the anchoring plate on the retaining pin.

According to another aspect, there is provided a measurement tool for a measuring head having a coupling part for attaching the measurement tool, the coupling part comprising a number of first bearing elements, a magnet and a retaining pin, and the measurement tool comprising a disk with a number of second bearing elements, which, in engagement with the first bearing elements, define a defined position of the measurement tool on the coupling part, and the measurement tool further comprising an anchoring plate and at least one adjustable locking element configured to secure the measurement tool to the retaining pin, wherein the at least one locking element is arranged on the anchoring plate and the anchoring plate is detachably secured to the disk.

According to another aspect, there is provided a measuring head for a coordinate measuring machine, comprising a coupling part and a measurement tool detachably coupled to the coupling part, wherein the coupling part has a number of first bearing elements, a magnet and a retaining pin, and wherein the measurement tool has a disk with a number of second bearing elements, an anchoring plate and at least one adjustable locking element, wherein the magnet is configured to attract the anchoring plate so as to bring the first and second bearing elements into engagement with one another, wherein the first and second bearing elements, in the engaged state, define a defined position of the measurement tool on the coupling part, and wherein the at least one locking element secures the measurement tool to the retaining pin, wherein the anchoring plate is detachably secured to the disk and the at least one locking element retains the anchoring plate on the retaining pin.

Preferably, the anchoring plate is attached to the disk such that it is detachable in a destruction-free manner and thus reversibly in principle, i.e. the type of attachment permits repeated detachment and joining of the anchoring plate and the disk.

In the novel measuring head, a predetermined breaking point, which allows the measurement tool to reversibly separate from the measuring head in the event of a collision, has been moved into the measurement tool. In contrast, the predetermined breaking point of known measuring heads with collision protection is located in the measuring head. At first glance, the novel measuring head therefore might have the disadvantage that it is not protected by itself against damage in the event of a collision. Rather, collision protection depends on the coupled-on measurement tool. The danger here is that a user deactivates the collision protection when using a measurement tool that does not correspond to the present invention. The novel realization, however, has the advantage that the measuring head and in particular the retaining pin in the measuring head can be produced in a simpler and easier manner while also being more stable.

The novel approach further has the advantage that wear, which can be caused by friction on the predetermined breaking point, occurs in the (typically less expensive) measurement tool and not in the relatively expensive measuring head. If the predetermined breaking point for the collision protection exhibits wear due to collisions and/or play in everyday use, all that is needed is to replace the rather inexpensive measurement tool.

Surprisingly, the predetermined breaking point in the measurement tool does not adversely affect the accuracy of the measurement tool or of the measuring head having the novel measurement tool, since the relative position of the measurement tool on the coupling part continues to be determined by the first and second bearing elements. Even if the anchoring plate should have play with respect to the disk of the measurement tool, this does not decrease the positioning accuracy of the measurement tool on the coupling part, since the position of the measurement tool is determined only by the first and second bearing elements and not by the anchoring plate.

As will be explained below with reference to preferred exemplary embodiments, the novel measuring head can advantageously be realized as a probe head without an integrated rotary drive for rotating the probe tool. Rather, the novel measurement head is capable of rotating the probe tool by using one or more measurement force generators which generate a desired rotary movement using a roll projection on the probe head. The retaining pin substantially serves in this case merely for retaining the measurement tool on the probe head during the rotation so that the measurement tool does not fall down when the anchoring plate is removed from the magnet. Owing to the novel arrangement, the retaining pin can efficiently absorb radial loads which result from the rotary movement on the roll projection.

Overall, the novel measuring head having the novel measurement tool offers reliable collision protection, which can be realized more simply and more cost-effectively than in known measuring heads by the anchoring plate of the measurement tool detachably attaching in a destruction-free manner to the disk of the measurement tool, wherein the disk may hold a probe stylus, a camera, a laser or another sensor for determining spatial coordinates. The above-mentioned object is thus completely achieved.

In a preferred refinement, the magnet generates a defined first retaining force with which the anchoring plate is attracted, wherein the anchoring plate is secured to the disk with a defined second retaining force, and wherein the second retaining force is greater than the first retaining force. In some exemplary embodiments, the second retaining force may be greater than 80 N and preferably greater than 100 N.

At first glance, one could assume that it is advantageous for the collision protection if the predetermined breaking point in the measurement tool is more fragile than the connection between the measurement tool and the coupling part, since it is the predetermined breaking point in the measurement tool that is meant to yield in the event of a collision. However, it has been shown that the retaining force with which the magnet attracts the anchoring plate can still be smaller than the second retaining force with which the anchoring plate is held on the disk, since the first and second bearing elements, when engaged, provide additional stabilization of the connection. For this reason, the predetermined breaking point between the anchoring plate and the disk is more likely to detach in operation of the novel measuring head than the connection between the anchoring plate and the magnet, even if the retaining force of the magnet itself is smaller. On the other hand, this configuration has the advantage that the magnet cannot separate the anchoring plate from the disk of the measurement tool. The configuration therefore permits a more stable and reliable changing of the measurement tool.

In a further refinement, the at least one locking element is arranged below the anchoring plate if the measurement tool is coupled to the coupling part.

In this refinement, the locking element carries or supports the anchoring plate from below against the force of gravity when the anchoring plate is not attracted by the magnet in the coupling part. On the other hand, the anchoring plate retains the disk as long as the (second) retaining force between anchoring plate and disk is not subjected to excess pressure following a collision. One could say that the anchoring plate is suspended on the locking element and for its part retains the measurement tool, which extends downward from the locking element. The refinement permits a cost-effective realization by the locking element being placed in a recess in the disk and subsequently being fixed to the disk using the anchoring plate. In addition, this refinement makes it possible for the anchoring plate to rest against the magnet over a large area and thus makes possible a great first retaining force using a relatively small magnet.

In a further refinement, the measurement tool has at least one spring element, which secures the anchoring plate to the disk with the defined second retaining force.

Such fixing is a simple and cost-effective variant, which not only offers stable operation in all cases without collisions, but at the same time offers sufficient collision protection. In addition, the user can readily re-join the anchoring plate and the disk if the disk was separated from the anchoring plate in the case of a collision.

In a further refinement, the spring element is a helical spring, which extends annularly around the anchoring plate.

In this refinement, the spring element is a helical spring, which for its part is bent in the shape of a ring. The "core" of the helical spring preferably extends concentrically with respect to the retaining pin if the measurement tool is secured to the retaining pin. This refinement has proven to be a very reliable connection between the anchoring plate and the disk. The circumferential helical spring offers a highly uniform retaining force around the anchoring part. Point-type loads that could lead to increased wear are minimized. At the same time, the retaining force can be dimensioned effectively with such a spring element so as to achieve the preferred ratio of first and second retaining forces.

In a further refinement, the disk has a recess, in which the anchoring plate is held detachably. The anchoring plate preferably sits in the recess with accurate fit, with the spring element being arranged between the external circumference of the anchoring plate and the inner jacket of the recess.

This refinement permits highly reliable and yet detachable connection between the anchoring plate and the disk. It minimizes or even avoids the risk that the anchoring plate can become separated from the disk if the measurement tool is not on the retaining pin, for example if the measurement tool is placed in a tool magazine. The arrangement of the anchoring plate in the recess avoids impact locations or points of attack where the anchoring plate can become disengaged against the second retaining force.

In a further refinement, the retaining pin has a longitudinal axis and is displaceable axially along the longitudinal axis.

This refinement is advantageous in order to separate (disengage) the two bearing elements on the measurement tool from the first bearing elements on the coupling part, without the measurement tool and the measuring head completely disconnecting from each other. This refinement therefore simplifies the preferred rotation of the measurement tool relative to the measuring head.

In a further refinement, the retaining pin is rotatable about the longitudinal axis, wherein the first and second bearing elements define a plurality of defined rotation angle positions.

This refinement is based on the previously mentioned refinement by way of the retaining pin enabling a rotation of the measurement tool on the measuring head. The novel type of collision protection is very advantageous especially in those cases where the retaining pin must absorb various loads in different directions.

In a further refinement, the measuring head has a detector and the at least one locking element has a locking position in which it secures the anchoring plate to the retaining pin, and at least one release position, in which it releases the anchoring plate, wherein the detector generates a signal that is representative of the locking position and/or the release position.

In this refinement, the measuring head has a detector which is used to monitor the function of the locking mechanism. The detector generates a signal that is representative of at least one of the positions of the locking element (locking position and/or release position). Accordingly, the signal is configured to indicate the respective position of the locking element. The signal of the detector is preferably evaluated in the measuring head and/or a controller connected to the measuring head so as to early identify insufficient attachment of the measurement tool to the retaining pin and to output, in dependence thereon, a warning signal to the operator of the machine and/or trigger an operational stop. Furthermore preferred is that the control unit prevents, in dependence on the signal of the detector, disengagement of the rotary disk and, if appropriate, an associated change in the rotation angle position.

Alternatively or in addition, the locking mechanism could be of a fail-safe design, for example by way of a mechanical construction that rules out attachment of the probe tool with insufficient locking of the locking element. The use of a detector for generating a specific monitoring signal, however, simplifies the mechanical construction of the interface between measurement tool and coupling part. Moreover, the detector makes it possible to take into account changes in the mechanical interface between rotary disk and coupling part, such as by contamination or wear.

In a further refinement, the disk has at least one identification circuit and the coupling part has a sensor for reading the at least one identification circuit.

An identification circuit in the context of this refinement is a—preferably electronic—circuit containing coding that identifies the measurement tool. A preferred identification circuit includes a memory in which the coding is digitally stored. In principle, the identification circuit could also have mechanical coding, which is read mechanically, electrically and/or optically using a suitable sensor in the coupling part. The refinement has the advantage that the probe head can recognize the identity and properties of the probe tool simply and in an automated fashion, for example so as to determine the number of possible rotation angle positions and/or the presence of the novel detector.

In a further refinement, the detector is configured to prevent the identification circuit from being read by the sensor in dependence on the locking position and/or the release position.

This refinement makes possible a very simple, cost-effective and space-saving realization of the detector, by the detector using the coding which is already supplied by the identification circuit to generate the monitoring signal for the locking mechanism. In one preferred exemplary embodiment, the detector prevents the identification circuit being read if the locking element is not in its locking position. The "signal" of the detector in this case consists in the fact that the sensor receives no signal from the identification circuit. The detector can therefore be a passive element, which is advantageous for minimizing heating of the measuring head during the measurement operation.

In a further refinement, the detector comprises a passive electric switch, which is arranged electrically in series with the at least one identification circuit. This refinement makes possible a very simple, cost-effective and reliable realization of the detector. The switch is preferably closed only if the locking element is in its locking position, so that the identification circuit can only be read if the locking mechanism is closed. The electric switch is preferably a mechanically actuated microswitch. A switch of this type can be integrated well in the small installation space of a rotary disk.

In another refinement, the locking mechanism includes two—preferably spring-loaded—sliders, which are displaceable in mutually opposing directions in order to bring the at least one locking element into the release position.

Two opposed sliders facilitate simple and reliable opening and closing of the locking mechanism. Moreover, a locking mechanism having at least two opposed locking elements is robust and tolerant with respect to slight positioning inaccuracies when inserting the rotary disk. Such inaccuracies are compensated by opposed elements. Spring-loaded sliders have the advantage that they ensure a defined resting position in which the rotary disk is preferably locked on the retaining pin.

The preferred sliders each have a free end, wherein the free ends in the resting position are located diametrically with respect to one another and project radially beyond the rotary disk's edge. This refinement makes possible simple manual actuation and effectively reproducible machine actuation of the locking mechanism.

BRIEF DESCRIPTION OF THE DRAWINGS

It is to be understood that the previously mentioned features and the features explained below are applicable not only in the respectively specified combination but also in other combinations or alone, without deviating from the scope of the present invention.

Exemplary embodiments of the invention are illustrated in the drawing and will be explained in more detail in the following description. In the figures.

DESCRIPTION OF PREFERRED EMBODIMENTS

Figure 1:
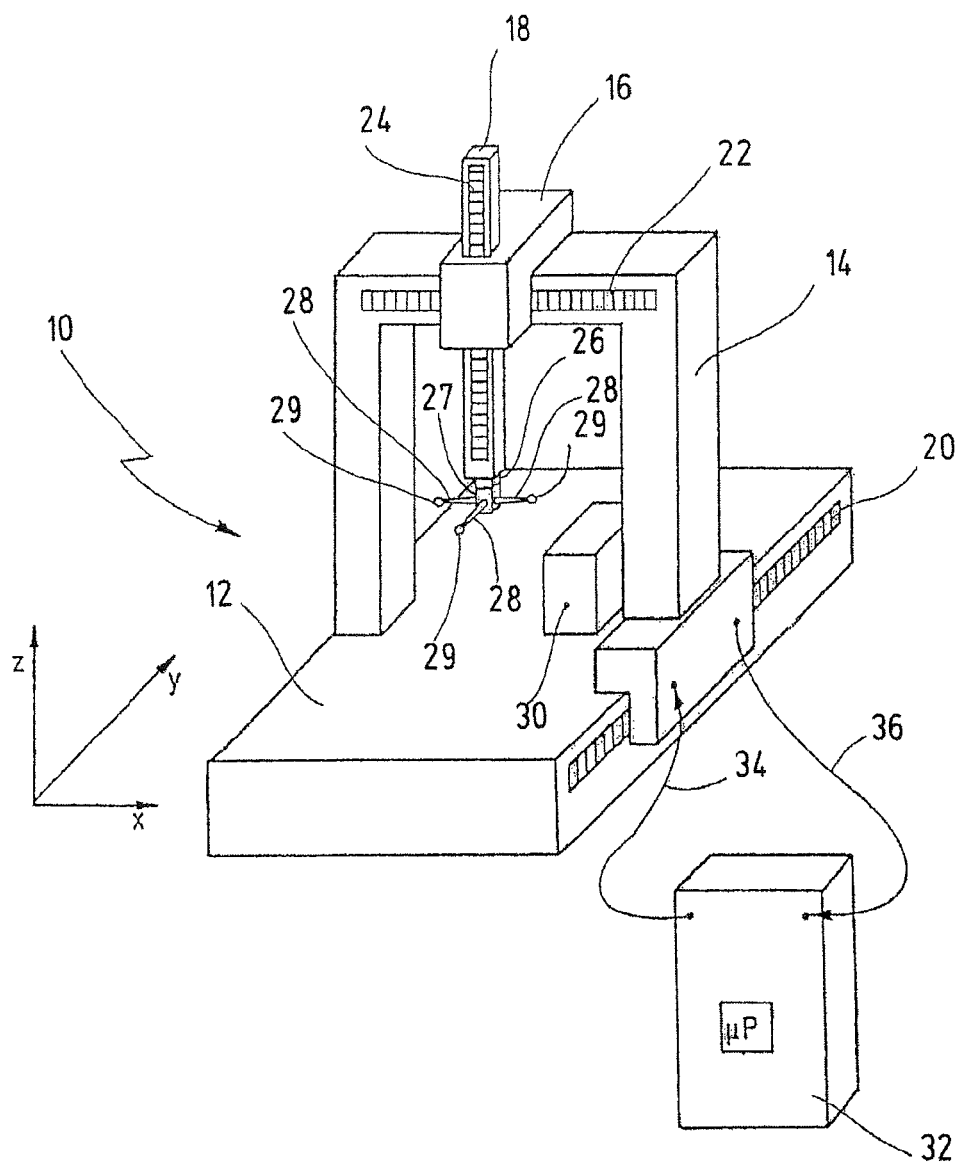
FIG. 1 shows a coordinate measuring machine having a probe head according to an exemplary embodiment of the invention.

In FIG. 1, a coordinate measuring machine having the novel probe head is designated overall with the reference numeral 10. The coordinate measuring machine 10 here has a base 12, on which a portal 14 is arranged so as to be moveable in the longitudinal direction. The movement direction of the portal 14 relative to the base 12 is generally referred to as the Y axis. Arranged on the upper cross member of the portal 14 is a carriage 16, which is displaceable in the transverse direction. The transverse direction is usually referred to as the X axis. The carriage 16 carries a quill 18, which can be moved in the Z direction, i.e. perpendicular to the base 12. Reference numerals 20, 22, 24 designate measurement scales, which can be used to determine the position of the portal 14, of the carriage 16 and of the spindle 18. The measurement scales 20, 22, 24 are typically glass measurement scales which are read using suitable sensors.

Arranged on the lower free end of the quill 18 is a probe head 26, which holds a probe tool 27. The probe tool 27 here has three styli 28, which at their respective free ends each have a ball 29. The ball is used to touch a measurement point on a measurement object 30. The measurement scales 20, 22, 24 can be used to determine the position of the probe head 26 within the measurement volume during the probing of the measurement point. In dependence thereon, spatial coordinates of the probed measurement point within the measurement volume, which is defined by the movement axes of the measuring head, can be determined.

Reference 32 designates an evaluation and control unit which is connected to the drives and sensors on the portal via lines 34 and 36. The control unit 32 serves to drive the drives for the movements of the probe head 26 along the three coordinate axes X, Y and Z. In addition, the evaluation and control unit 32 reads in the measurement values from the measurement devices 20, 22, 24, and it determines, in dependence thereon and in dependence on the deflections of the probe tool 27, the current spatial coordinates of the probed measurement point.

Figure 2:
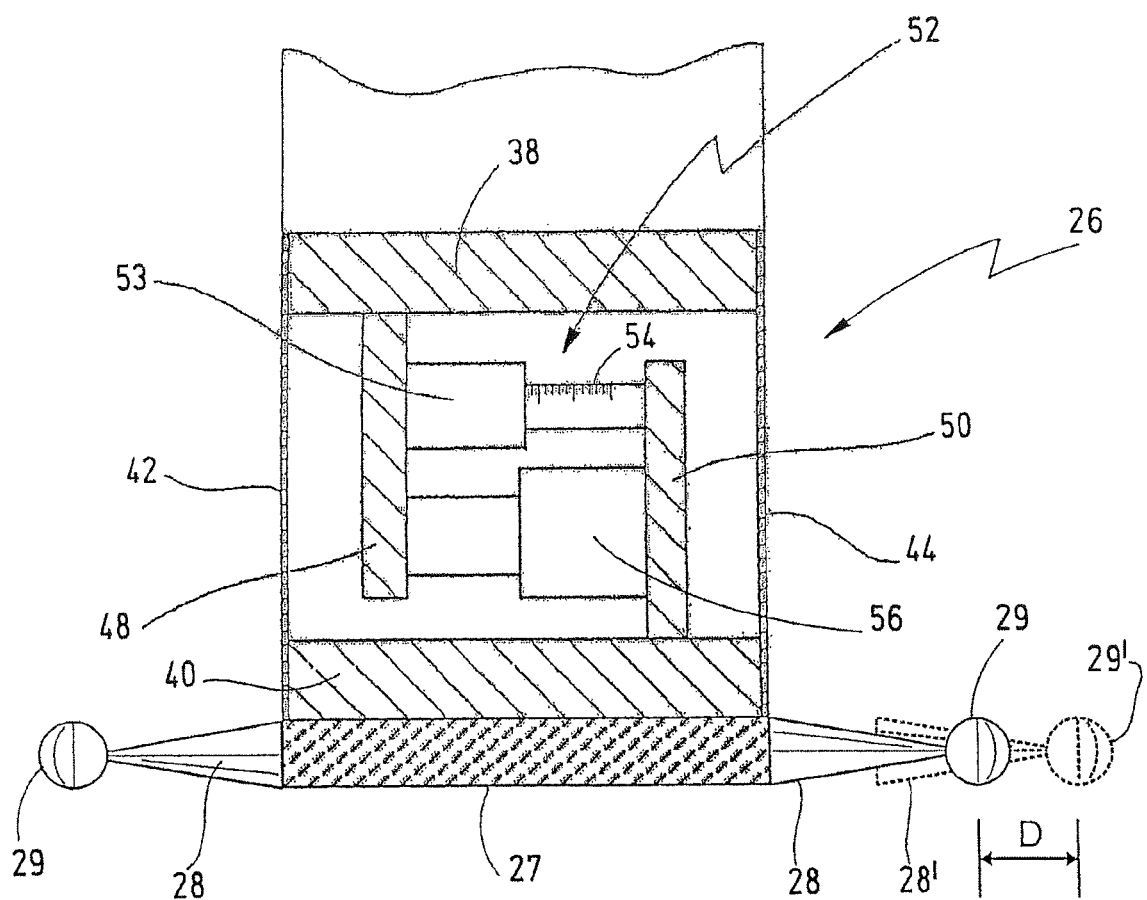
FIG. 2 shows a highly simplified illustration of the probe head having a probe head sensor system and a measurement force generator.

FIG. 2 shows, on the basis of a highly simplified, schematic illustration, the basic function of the probe head 26. The probe head 26 has a body part 38 and a coupling part 40, which in this case are connected via two leaf springs 42 and 44. The leaf springs 42, 44 form a spring parallelogram which allows the coupling part 40 to move in the direction of the arrow 46 (and back in the direction of the arrow 46'). The probe tool 27 with the styli 28 can thus be deflected from its resting position by a distance D.

There is a leg 48, 50 arranged on each of the body part 38 and the movable part 40, respectively. The legs 48, 50 are parallel to the leaf springs 42, 44 here. A deflection detector 52 (having a plunger coil 53 and a plunger body 54 in this case) and a measurement force generator 56 are arranged between the legs 48, 50. The plunger coil 53 generates an electrical signal in dependence on the plunging movement of the plunger body 54. Alternatively or in addition, Hall sensors, piezoresistive sensors, magnetoresistive sensors or any other sensor (such as optical sensors) which can be used to determine the spatial deflection of the probe tool 27 relative to the body part 38 are conceivable deflection detectors 52. The measurement force generator 56 is in this case likewise configured as a plunger coil. The measurement force generator 56 can be used to pull together the two legs 42 and 50 or to push them apart.

In the highly simplified illustration in FIG. 2, the probe head 26 allows the probe tool 27 to be deflected merely in the direction of the arrow 46. A person skilled in the art will know, however, that a probe head 26 typically allows corresponding deflection in two other, orthogonal spatial directions. This can be realized for example using further spring parallelograms and/or a diaphragm spring. However, the invention is not limited to this specific realization and can also be used in other types of measuring heads.

Figure 3:
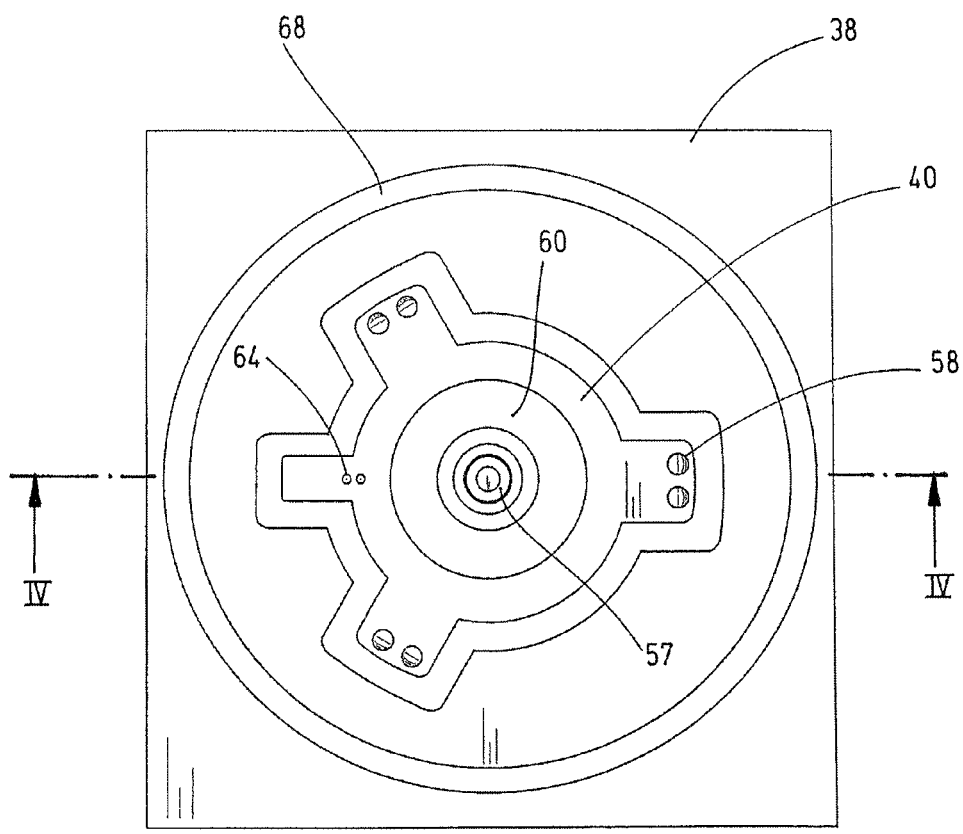
FIG. 3 shows a preferred exemplary embodiment of the probe head with a view onto the coupling part from below.
Figure 4:
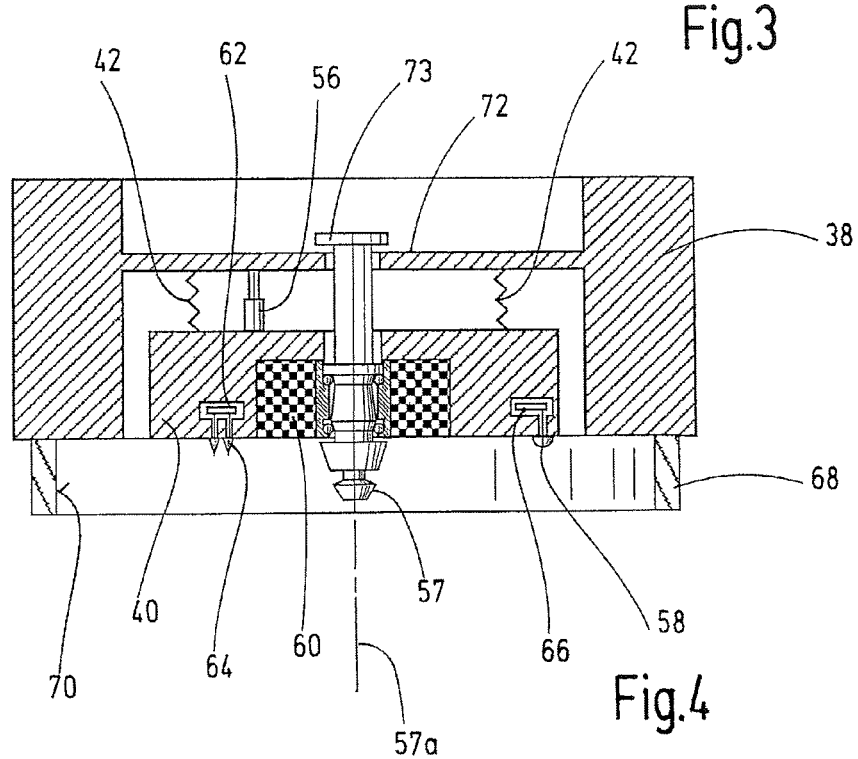
FIG. 4 shows the coupling part of FIG. 3 in a sectional view along the line IV-IV.

FIG. 3 shows a preferred exemplary embodiment of the probe head 26 with a view onto the change interface from below (that is to say without probe tool 27). FIG. 4 shows a simplified section of the probe head of FIG. 3 along the section line IV-IV.

The body part 38 holds the coupling part 40, which is movable on the body part 38 in preferably three orthogonal spatial directions. For the sake of simplicity, FIG. 4 shows only two spring elements 42 which make possible the three orthogonal movement directions. The coupling part 40 here has a pin 57, which is guided in the coupling part 40 to move axially, i.e. along its longitudinal axis. (The axial movement is described in detail in DE 10 2009 008 722 A1 mentioned in the introduction, which is incorporated here by reference). In the edge region of the coupling part 40, three ball pairs 58 are arranged which form first bearing elements for a kinematic mount of the probe tool 27. The coupling part 40 furthermore has a magnet 60, here in the form of an annular electromagnet. Alternatively, the magnet may be a permanent magnet, which is strengthened or weakened by an additional electromagnet. The magnet 60 is arranged here concentrically with respect to the pin 57 on the coupling part 40. The coupling part 40 in this exemplary embodiment further has a first sensor 62 with two contacts 64 and a second sensor 66. Finally, a cylinder sleeve 68 having an inner jacket 70 is formed on the body part 38. The cylinder sleeve 68 here extends concentrically with respect to the pin 57 and forms a roll projection 68, which can be used in preferred exemplary embodiments for rotating the probe tool 27. The rotation of the probe tool 27 using the roll projection 68 is described in detail in DE 10 2009 008 722 A1 already mentioned, which again is incorporated here by reference insofar.

As has already been mentioned in the explanation of FIG. 2, the position of the coupling part 40 relative to the body part 38 can be changed using measurement force generators 56. This is usually done to generate a defined measurement force when probing a measurement point. In order to additionally permit advantageous movement of the pin 57 relative to the coupling part 40, a stop 72 is provided in the illustrated exemplary embodiment, which stop 72 is in this case formed on the body part 38 or is at least rigidly connected thereto. The stop 72 interacts with a counterpiece 73, which is formed on the upper end of the pin 57. In FIG. 4, the upper end of the pin 57 projects upwardly beyond the stop 72, and the counterpiece 73 is arranged above the stop 72. If the coupling part 40 is pressed down using the measurement force generator 56, the pin 57 follows this movement until the counterpiece 73 abuts the stop 72 from above. From this position, the pin 57 is blocked against any further downward movement. The coupling part 40, on the other hand, can be pressed down further using the measurement force generator 56. From the point at which the pin 57 is blocked on the stop 72 by the counterpiece 73, the measurement force generator 56 only moves the coupling part 40 down, and no longer the pin 57. In other words, the measurement force generator 56 pushes the coupling part 40 downward relative to the pin 57. Since the pin 57, at its bottom free end, is configured to retain the probe tool 27 (see FIGS. 7 and 8), the measurement force generator 56 and the stop 72 can be used to vary the distance between the coupling part 40 and the probe tool 27. In exemplary embodiments, this is advantageously used to "gently" move the coupling part 40 toward the probe tool 27 and subsequently attract it using the magnet 60.

Figure 5:
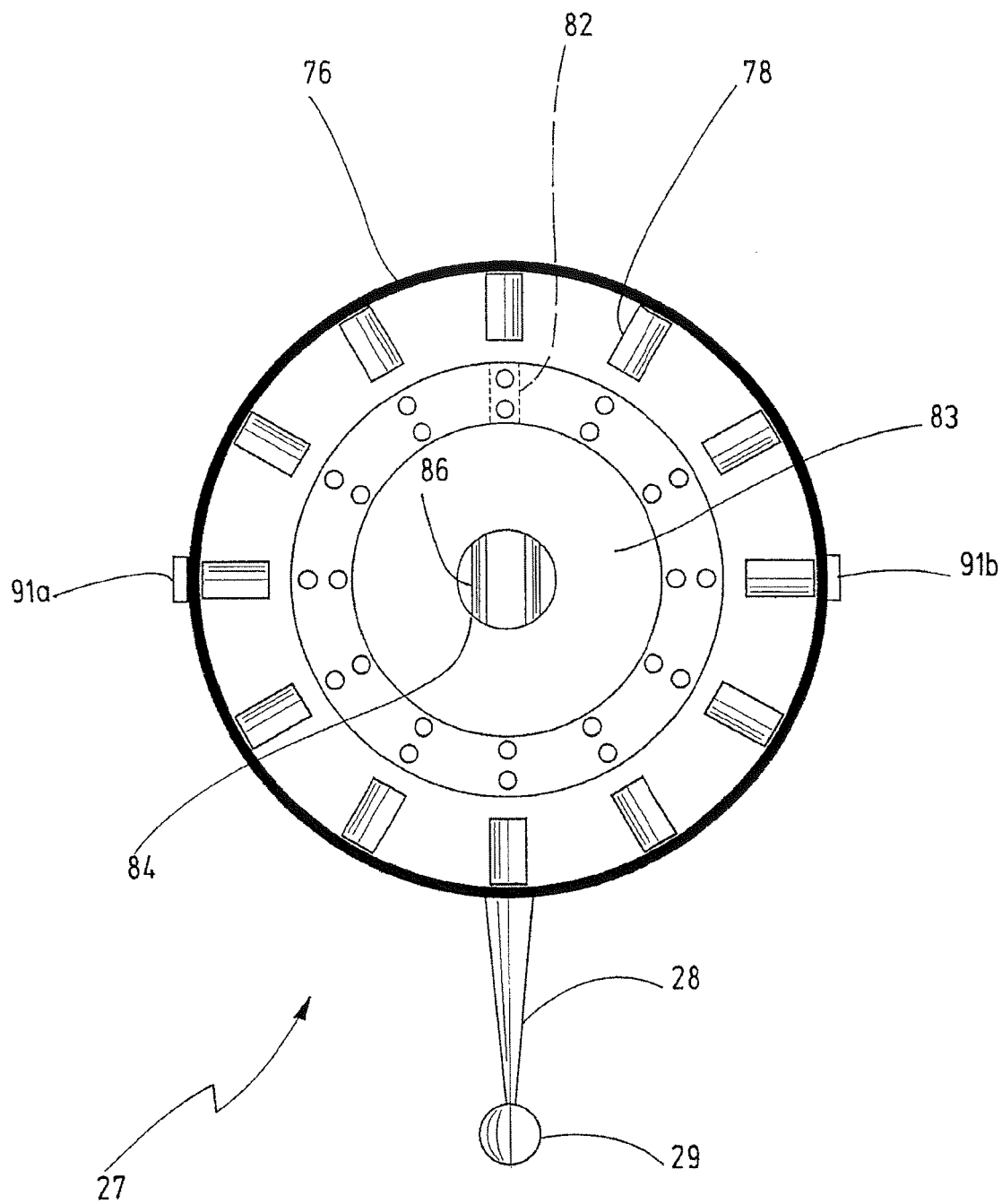
FIG. 5 shows an exemplary embodiment of a probe tool with a view onto the disk which can be coupled to the coupling part of FIG. 3.

FIG. 5 shows an exemplary embodiment of the probe tool 27 with a view onto the interface by which the probe tool 27 is coupled to the coupling part 40. The probe tool 27 has a rotary disk 74, which in this case is in the shape of a circle. A traction element 76 is arranged on the external circumference of the rotary disk 74. The traction element may be a rubber ring or an external tooth system, which interacts with a corresponding tooth system on the inner jacket 70 (not illustrated here) of the roll projection 68. The rotary disk 74 in this case has a plurality of rollers 78, which interact as bearing elements with the ball pairs 58 on the coupling part 40 so as to effect a reproducible, kinematically determined mounting of the probe tool 27 on the coupling part 40. Other bearing elements which effect a kinematic mounting of the probe tool 27 on the coupling part 40, such as a Hirth tooth system, can also be used instead of the bearing elements that are illustrated here in the shape of rollers and ball pairs. Furthermore, the rollers 78 can in principle be the bearing elements on the coupling part 40, while ball pairs 58 are formed on the rotary disk 74.

The rollers 78 are arranged here in the circumferential direction of the rotary disk 74 with equal spacings between them. Two contacts 80, which interact with the contacts 66 on the coupling part 40 if the rotary disk 74 on the coupling part 40 is secured in a rotation position that is defined by the rollers 78 and ball pairs 58, are arranged radially inwards with respect to each roller 78. Reference numeral 82 designates an identification circuit, for example in the form of a memory chip, on which individual coding is stored. Each identification circuit therefore contains unique information. The sensor 64 can in each case read only one identification circuit 82 via the contacts 66 and recognize, on the basis of the read coding, the rotation angle position of the probe tool 27 relative to the coupling part 40 and possibly further properties of the probe tool, such as the length of the probe stylus.

An anchoring plate 83 having a holder in the form of a circular opening 84 is arranged in the center of the rotary disk 74. The anchoring plate consists of a magnetizable material, such that it can be attracted by the magnet 60 on the coupling part 40. Two locking elements 86, which can be used to additionally secure the rotary disk 74 on the bottom free end of the pin 57, are arranged here on the anchoring plate 83. This allows, in the preferred exemplary embodiments, the rotation of the probe tool 27 via the pin 57 while the rollers 78 are disengaged from the ball pairs 58. In the illustrated exemplary embodiment, the locking elements 92 are two rods which are configured to engage in a groove at the bottom free end of the pin 57 (see FIGS. 7 and 8).

Figure 6:
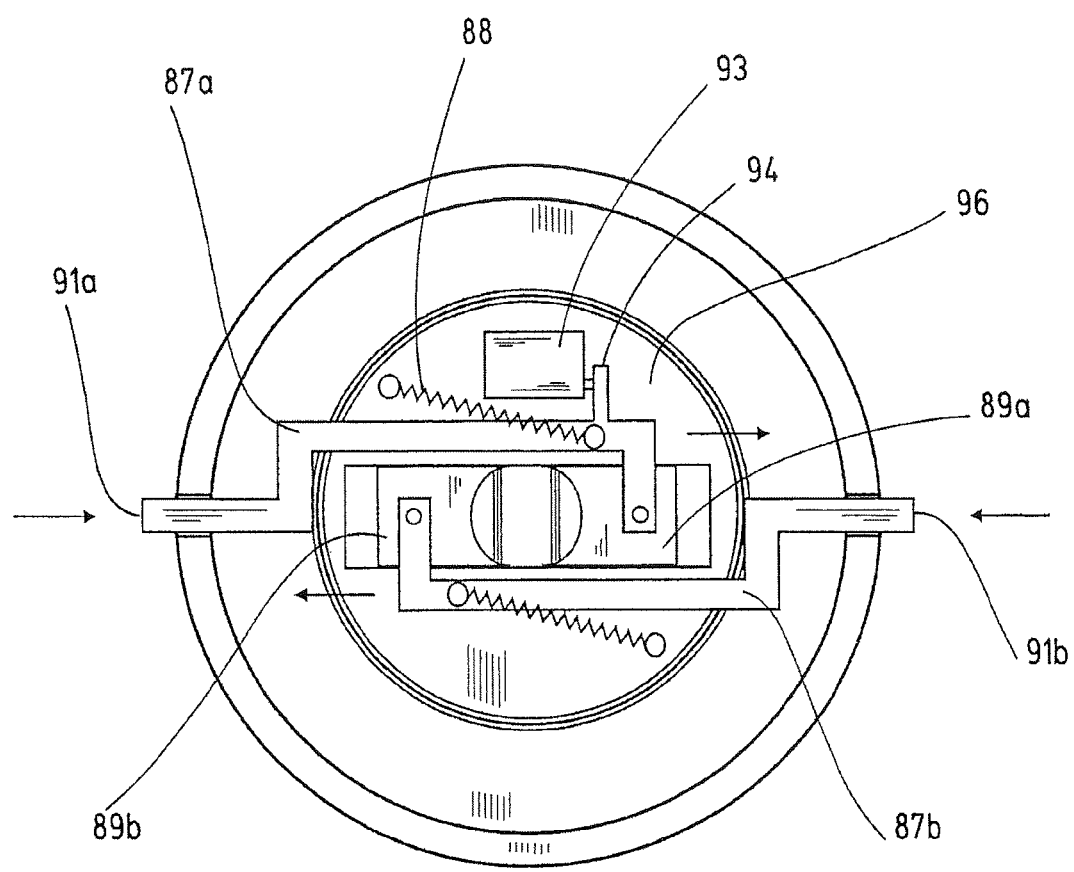
FIG. 6 shows a simplified illustration of the locking mechanism of the probe tool of FIG. 5.

FIG. 6 shows a locking mechanism with which the locking elements 86 can be opened or closed in order to secure the rotary disk 74 on the pin 57. In this exemplary embodiment, the locking mechanism has two sliders 87a, 87b, which are displaceable in mutually opposing directions. Each slider 87a, 87b is pre-tensioned via a spring element 88 into a resting position. In the preferred exemplary embodiments, the spring elements 88 pretension the sliders 87 into a resting position in which the locking elements 86 clamp the rotary disk 74 in place on the pin 57. In the preferred exemplary embodiment, each slider 87 is connected to in each case one clamping piece 89a, 89b. A locking pin 86 is arranged on each clamping piece 89a, 89b.

Owing to the sliders 87a, 87b being pushed together in the mutually opposing directions of the arrows shown in FIG. 6, the clamping pieces 89 can be pushed apart. Letting go of the sliders 87 results in the spring elements 88 pushing the locking pins 86 back together. For opening the locking mechanism, each slider 87 has a free end 91a, 91b, which projects outwardly beyond the external circumference of the rotary disk 74. In the preferred exemplary embodiments, the free ends 91a, 91b of the sliders 87a, 87b are located diametrically with respect to one another on the external circumference of the rotary disk 74.

In the preferred exemplary embodiments, the locking mechanism furthermore includes a detector 93 which is configured to detect the locking position and/or the release position of the locking elements 86. In the exemplary embodiment according to FIG. 6, the detector 93 is a microswitch with a switch contact which is arranged electrically in series with all contact pairs 80 of the rotary disk 74. The switch contact can be a mechanical contact or an electronic switch, such as in the form of a transistor. The switching position of the switch 93 is influenced by the slider 87a. In the position shown in FIG. 6, a lug 94 of the slider 87a touches the switch 93. The switch contact 95 is closed by the lug 94. In this position, the sensor 62 in the probe head 27 can read the identification circuit 82 whose contacts 80 are in contact with the contacts 64 on the coupling part. However, if the lug 94 does not press onto the switch 93, the sensor 62 cannot read any of the identification circuits 82. The absence of an identification signal in one of the identification circuits 82 is a signal that is used by the detector 93 to indicate that the locking elements 86 are not properly closed.

Figure 7:
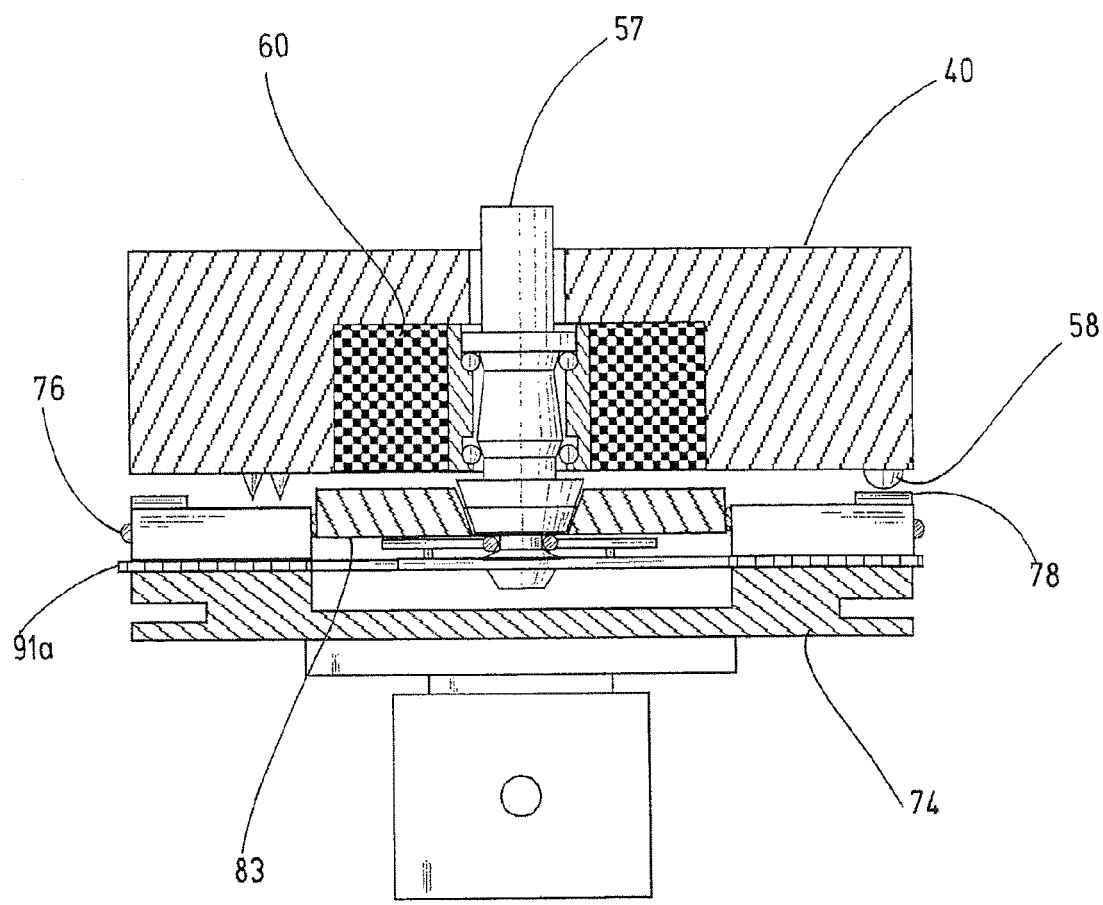
FIG. 7 shows a simplified illustration of the probe tool of FIG. 5 on the coupling part of FIGS. 3 and 4.
Figure 8:
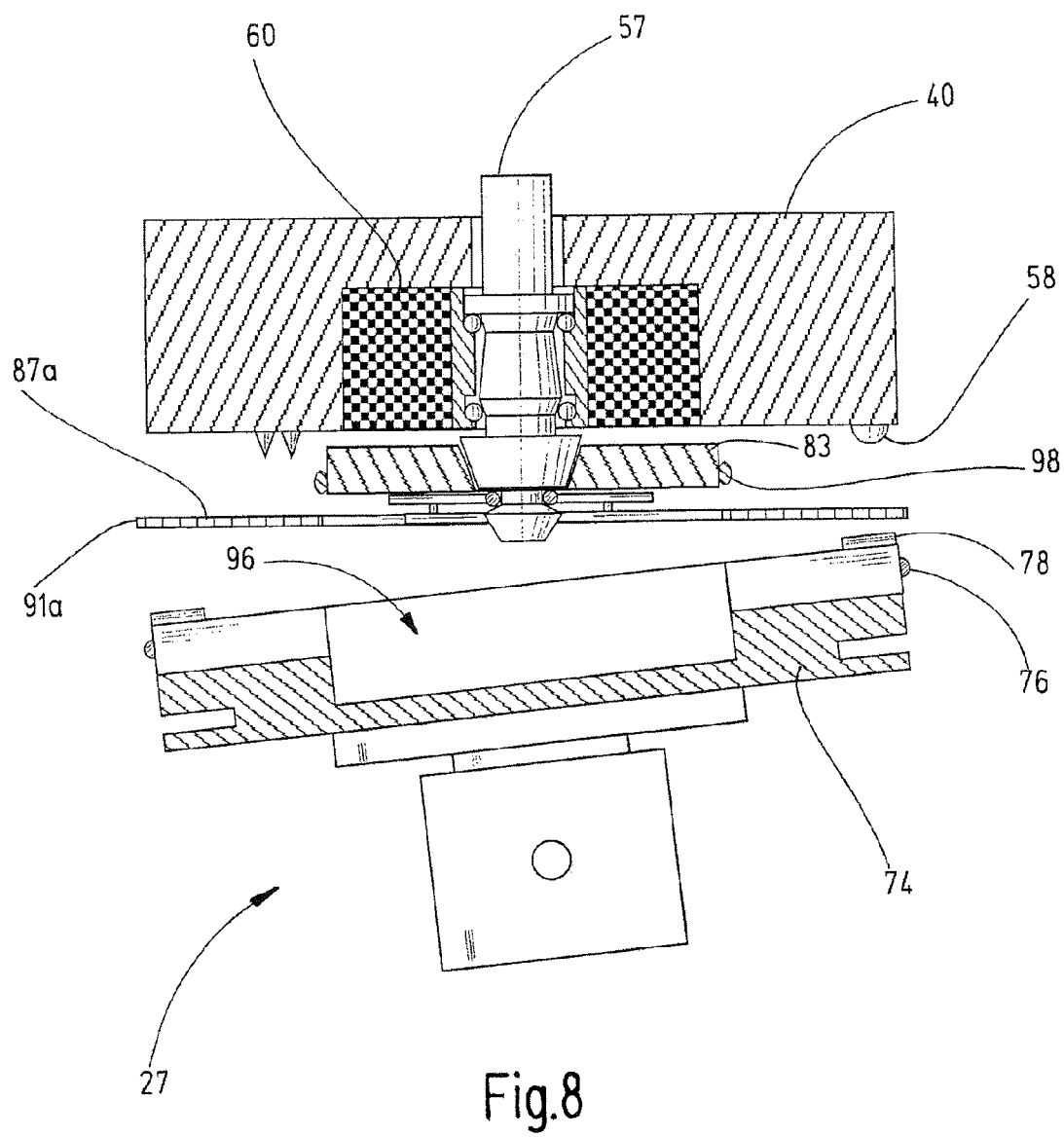
FIG. 8 shows the coupling part and the probe tool of FIG. 7 in the event of a collision.

FIGS. 7 and 8 show a sectional view of the coupling part 40 with the rotary disk 74 in an operating position, in which the rollers 78 are disengaged from the ball pairs 58 such that the rotary disk 74 can be rotated on the roll projection 68. As can be seen in FIG. 8, the rotary disk 74 has a recess 96, in which the magnetizable anchoring plate 83 is held with an accurate fit. In this exemplary embodiment, the anchoring plate 83 is held in the recess 96 by a spring element 98. The spring element 98 in this case is a helical spring, which is arranged in the shape of a ring around the (in this case circular) anchoring plate 83 on said anchoring plate. Alternatively or in supplementation, the spring element 98 could be arranged on the rotary disk 74, for example in the recess 96. In one preferred exemplary embodiment, the spring element 98 is a spiral spring which is arranged to form a ring, as is available for example from Bal Seal Engineering, Inc., 19650 Pauling, Foothill Ranch, Calif. 92610-2610, USA.

In other exemplary embodiments, the anchoring plate can be secured in the recess 96 using a retaining ring, using tension wires, using spring-loaded retaining pins and/or using further magnets (not illustrated here).

It is preferred in all exemplary embodiments if the retaining force with which the anchoring plate 83 is secured to the rotary disk 74 is greater than the retaining force with which the anchoring plate 83 is attracted by the magnet 60 in the coupling part 40, such that the magnet 60 cannot tear the anchoring plate 83 off the rotary disk 74. At the same time, the retaining force with which the anchoring plate 83 is secured to the rotary disk 74 should be only somewhat greater than the retaining force with which the anchoring plate 83 is attracted by the magnet 60 in the coupling part 40, so that the rotary disk 74 can easily pull away from the anchoring plate 83 and the coupling part 40 in the event of a collision with an obstacle, without a damaging introduction of force into the coupling part 40 occurring.

As can be seen in the illustration in FIG. 8, the anchoring plate 83 with the locking mechanism remains on the retaining pin 57 in the event of a collision, while the rotary disk 74 pulls away from the anchoring plate 83. In some exemplary embodiments, the anchoring plate 83 can additionally be connected via a wire or another flexible element (not illustrated here) to the disk 74 of the measurement tool, so as to prevent the disk 74 from falling onto the workpiece or the base of the coordinate measuring machine in an uncontrolled manner when it pulls away from the anchoring plate. Such a safety wire is known for example from DE 10 2009 008 722 A1 mentioned in the introduction, which to this extent is also incorporated here by reference.

What is claimed is:

1. In a coordinate measuring machine for determining spatial coordinates on a measurement object, a measuring head comprising;
   a coupling part for receiving a measurement tool, and
   a measurement tool detachably coupled to the coupling part;
   wherein the coupling part has a number of first bearing elements, a magnet and a retaining pin,
   wherein the measurement tool has a disk with a number of second bearing elements, an anchoring plate and at least one adjustable locking element,
   wherein the magnet is configured to attract the anchoring plate so as to bring the first and second bearing elements into engagement with one another,
   wherein the first and second bearing elements, in the engaged state, define a defined position of the measurement tool on the coupling part,
   wherein the at least one locking element secures the measurement tool to the retaining pin,
   wherein the anchoring plate is detachably secured to the disk, and
   wherein the at least one locking element retains the anchoring plate on the retaining pin.

2. The measuring head of claim 1, wherein the magnet generates a defined first retaining force with which the anchoring plate is attracted, wherein the anchoring plate is secured to the disk with a defined second retaining force, and wherein the second retaining force is greater than the first retaining force.

3. The measuring head of claim 1, wherein the at least one locking element is arranged below the anchoring plate if the measurement tool is coupled to the coupling part.

4. The measuring head of claim 1, further comprising at least one spring element, which secures the anchoring plate to the disk.

5. The measuring head of claim 4, wherein the spring element is a helical spring, which is arranged annularly around the anchoring plate.

6. The measuring head of claim 1, wherein the disk has a recess, in which the anchoring plate is detachably held.

7. The measuring head of claim 1, wherein the retaining pin has a longitudinal axis and is axially displaceable along the longitudinal axis.

8. The measuring head of claim 1, wherein the retaining pin is rotatable, the first and second bearing elements defining a plurality of defined rotation angle positions.

9. The measuring head of claim 1, further comprising a detector, wherein the at least one locking element has a locking position in which it secures the anchoring plate to the retaining pin, and at least one release position, in which it releases the anchoring plate, and wherein the detector generates a signal that is representative of at least one of the locking position and the release position.

10. The measuring head of claim 9, wherein the disk has at least one identification circuit and the coupling part has a sensor for reading the at least one identification circuit.

11. The measuring head of claim 10, wherein the detector is configured to prevent the identification circuit from being read by the sensor in dependence on at least one of the locking position and the release position.

12. The measuring head of claim 10, wherein the detector comprises a passive electric switch, which is arranged electrically in series with the at least one identification circuit.

13. The measuring head of claim 12, wherein the switch is closed only if the locking element is in its locking position.

14. A measurement tool for a measuring head having a coupling part for attaching the measurement tool, the coupling part comprising a number of first bearing elements, a magnet and a retaining pin; the measurement tool comprising a disk with a number of second bearing elements, which, in engagement with the first bearing elements, define a defined position of the measurement tool on the coupling part, and further comprising an anchoring plate and at least one adjustable locking element configured to secure the measurement tool to the retaining pin; wherein the at least one locking element is arranged on the anchoring plate and the anchoring plate is detachably secured to the disk.

15. The measurement tool of claim 14, further comprising at least one spring element, which secures the anchoring plate to the disk.

16. The measurement tool of claim 15, wherein the spring element is a helical spring, which is arranged annularly around the anchoring plate.

17. The measurement tool of claim 14, wherein the disk has a recess, in which the anchoring plate is detachably held.

18. A measuring head for a coordinate measuring machine, comprising a coupling part and a measurement tool detachably coupled to the coupling part; wherein the coupling part has a number of first bearing elements, a magnet and a retaining pin, and wherein the measurement tool has a disk with a number of second bearing elements, an anchoring plate and at least one adjustable locking element; wherein the magnet is configured to attract the anchoring plate so as to bring the first and second bearing elements into engagement with one another; wherein the first and second bearing elements, in the engaged state, define a defined position of the measurement tool on the coupling part; wherein the at least one locking element secures the measurement tool to the retaining pin; and wherein the anchoring plate is detachably secured to the disk and the at least one locking element retains the anchoring plate on the retaining pin.

* * * * *